(12) United States Patent
Man

(10) Patent No.: US 11,278,152 B2
(45) Date of Patent: Mar. 22, 2022

(54) AIR FRYER OVEN

(71) Applicant: Ningbo Biyi Electric Appliance Co., Ltd, Yuyao (CN)

(72) Inventor: Kaimong Man, Yuyao (CN)

(*) Notice: Subject to any disclaimer, the term of this patent is extended or adjusted under 35 U.S.C. 154(b) by 717 days.

(21) Appl. No.: 16/237,791

(22) Filed: Jan. 2, 2019

(65) Prior Publication Data
US 2020/0022531 A1  Jan. 23, 2020

(51) Int. Cl.
*A47J 37/06* (2006.01)
*A47J 37/04* (2006.01)

(52) U.S. Cl.
CPC ......... *A47J 37/0641* (2013.01); *A47J 37/047* (2013.01); *A47J 37/0664* (2013.01)

(58) Field of Classification Search
CPC ........ A47J 37/0641; A47J 27/00; A47J 27/08; A47J 27/09; A47J 27/092; A47J 36/025; A47J 36/06; A47J 36/08; A47J 36/10; A47J 36/12; A47J 36/18; A47J 36/20; A47J 36/22; A47J 37/00; A47J 37/12; A47J 37/1204; A47J 37/1209; A47J 37/1214; A47J 537/1219; A47J 537/1266; A47J 37/1285; A47J 37/129; A47J 37/1295; A47J 37/047; A47J 37/0664
USPC .................. 99/324, 325, 330–343, 369, 391, 99/400–418, 422, 425, 426, 430, 440, 99/444, 447, 448, 449, 451, 483, 495, 99/501
See application file for complete search history.

(56) References Cited

U.S. PATENT DOCUMENTS

| | | | | |
|---|---|---|---|---|
| 2014/0366746 | A1* | 12/2014 | Tsai ..................... | A47J 37/0641 99/403 |
| 2016/0309956 | A1* | 10/2016 | Glucksman ........... | A47J 37/047 |
| 2017/0231430 | A1* | 8/2017 | Moon .................. | A47J 37/1266 99/331 |

* cited by examiner

*Primary Examiner* — Phuong T Nguyen
(74) *Attorney, Agent, or Firm* — Frank Marino

(57) ABSTRACT

An air fryer oven has a front opening and in inner cavity in an oven body, a door, an inner bracket with a support frame, an inner base plate, a rotating cage; a blower and a heater, and a motor to rotate the cage. Hot air in the circulates through the cavity to air fry food placed in the rotating cage.

8 Claims, 8 Drawing Sheets

AIR FRYER OVEN

FIELD OF THE INVENTION

The present invention relates to an electronic oven, or precisely, an air fryer oven.

BACKGROUND

Electric oven is a kind of sealed appliance for baking food or drying products, which is divided into household appliances and industrial ovens. Household ovens are generally used to process noodles, pastries, roast chicken, and roast duck, generally adjustable in the temperature range of 50-250° C., and user can select the desired temperature according to the type of food to be baked and roasted. The working principle of an electric oven is to bake and roast food using the radiant heat from the electric heating elements, certain existing electric ovens are provided with the rotating cage to facilitate the food processing, e.g.: the application number 201711133585.4 as disclosed in China patent documents, publication date: 16 Feb. 2018, description of the invention "A New Oil-free Air Oven with Rotating Cage"; this oven comprises the fryer body, the fryer body comprises the outer heat shield, inner heat shield, absorptive rotating cage and collecting bucket from top down, the top central part of the outer heat shield is provided with an air inlet, the top part of the outer heat shield is fastened and provided with a blade drive motor, the power input shaft of the blade drive motor cross through the inner part of the air inlet that is provided inside the inner heat shield, the mounting chamber for cooling blade is reserved at the joint between the bottom part of the outer heat shield and the inner heat shield. The absorptive rotating cage of the present invention can cyclically rotate at 360° and can fry the food at 360°; user can check the frying status of food from the accessible window that is provided on the inner heat shield. However, the rotating cage drive mechanism of the said oven remains to be modified. Furthermore, its opening mechanism is not a side door structure, and the cold air circulating structure and effect are poorly designed.

SUMMARY OF THE INVENTION

To overcome these deficiencies, the object of the present invention is to provide an air fryer for this technical field, which is specifically designed to solve the technical problem that the rotating cage structure of the side-door oven of similar product is poorly designed, the cage or oil filter net cannot be used simultaneously, the effect of cold and hot air circulation is not good, and the side door cannot be easily dissembled or cleaned. Its object can be realized by the following technical solutions.

An air fryer oven, wherein its top inner cover and the cover shell body form the body with front opening, a body shell door is provided at the opening, every three side faces of the cover shell body is provided with inner bracket, the front opening of the inner bracket is symmetrically provided with a support frame, the bottom part in the cover shell body is provided with a base shell, the flat surface of the base shell is provided with an inner base plate; the top inner cover is provided in the lower shell mouth of the upper shell body that is provided with a control circuit board inside, the top inner cover is provided with a top partition plate inside, the top partition plate is provided with a heating tube and a axial flow blade inside, the plate mouth of the top partition plate is provided with an air filter net, the body is provided with a rotating cage, the body portion at the bottom part of the rotating cage is provided with an oil filter net and an oil slag tray, the inner wall of the inner bracket is provided with a sliding groove for fitting an oil filter net; wherein the top inner cover at one side of the front opening of the said cover shell body is provided with a belt motor, the belt motor at one end of the top inner cover is joined with the belt pulley at one side of the central shaft of the rotating cage through the belt pulley, its other side is buckled to the first shaft block on the inner wall of the inner bracket, the central shaft of the rotating cage is provided on the end cap at both sides of the rotating cage that is provided with a rotating cage door, or buckled through the end cap at both ends of the rotating cage. The said structure is an oven with rotating cage, the rotating cage is rotated through the pulley motor that is provided in the top inner cover of the upper shell, the food slag and waste oil processed in the rotating cage will fall into the oil slag tray.

The said belt pulley is located in the chamber provided between the cover shell body and the inner bracket, the belt pulley in the chamber is fastened to the axle stand, the axle of the belt pulley extends into the second shaft block that is provided on the inner bracket, one side of the central shaft of the rotating cage is engaged with the axle of the belt pulley. The said structure facilitates the interchangeable and random assembly of the cage and makes it easier to remove the cage.

The top hollow hole of the upper shell is provided with a top cover, the top cover is buckled with the upper shell and is provided with a top cover, the upper shell above the shell door is provided with a touch screen assembly, the touch screen assembly is provided with a touch screen, and the upper shell at the rear side of the cover shell body is provide with a ventilation hood. The said structure facilitates the separation between the upper casing and the casing, that is, the separation of cold and hot air in the oven, and the mode setting of the oven.

The top portion of the said top inner cover is provided with a cooling chamber, the cooling chamber is provided with a cross flow blade, the motor shaft of the blade motor passes through the top inner cover and is simultaneously joined with the cross flow fan blade and the axial flow fan blade, the blade motor is provided at the mouth of the top inner cover through the mounting frame, the cross flow blade is like a disc, the inner wall at the mouth is provided with the curved blades which are tipped inwardly and centrally, the disc surface is provided with a blade hollow hole, the side where the mounting frame is buckled with the top inner cover is tightly joined with the ventilation hood, the ventilation hood of the top inner cover is provided with a through-hole that is accessible to the top partition plate. Therefore, the blade motor of the oven allows for controlled operation at high and low speed, which can meet the requirements of baking different foods, namely it can be function as a dried fruit machine.

The said shell door is buckled and hinged with the bottom side of the opening at one end of the base shell through the sliding buckles on two sides at one end, the sliding buckle is provided with a pin shaft and a push button head, the push button head is arranged at 90° with the pin shaft, the push button head extends out from the door cover shell through the shell door spring, when the shell door and the body are closed, the push button head of the sliding buckle is against the edge of the base in the body, the upper and lower ventilation holes are provided at the sliding buckle of the door cover shell and the closing position of the top part of the door cover shell respectively, the top inner cover corresponding to the ventilation hole at the top part of the door cover shell is provided with an ejector pin piston, the ejector pin piston is fastened on the top inner cover through the ejector pin spring and the ejector pin block, the transparent tempered glass is connected to the inner window of the door cover shell through the door cover frame and the high temperature resistant sealing ring, the front window of the door cover shell is connected with the translucent plastic, the translucent plastic is aligned with the transparent tempered glass, the upper and lower edges of the translucent plastic are provided with the lower surface case and the lower surface case, the door cover shell in the upper case is provided with the upper inner case.

The said sliding buckle is convenient for the removal and cleaning of the whole shell door, and makes it easier for the cold air in the shell door to circulate with the bottom part of the base shell and the upper shell through the upper and lower ventilation holes.

The two side faces of the front opening of the said cover shell body are symmetrically provided with the side net cover, the side case and the bottom case, the bottom case is provided in two ends at the bottom part of the cover shell body, the bottom case is triangular, the side case is provided at the upper corners in both ends of the cover shell body at one side of the front opening, the side case is "L-shaped", and the side net cover is provided in the frame that is formed by the side case and the bottom case. The said structure facilitates the decoration on both sides of the oven and the further process of cooling.

The inner wall of the said inner bracket is provided with a lighting hole, the lighting hole is provided with a light, and the inner wall of the inner bracket is provided with the upper, middle and lower chutes. Therefore, this oven can function as light and it will be used with the three-layer filter net after the rotating cage is removed.

The circulation system in respect of hot and cold zones of the oven is described below: the chamber located between the cover shell body and the inner bracket, and the passage between the upper and lower ventilation holes of the door cover shell and the ejector piston of the inner cover, are accessible to the base shell at the bottom part of the cover shell body respectively, cold air passes through the base shell at the bottom part of the cover shell body and the top hollow hole of the upper shell, and the cross flow blade in the top inner cover to allow for cold air circulation; hot air passes through the inner chamber that is formed by the bottom shell, the top inner cover and the shell door, and the cross flow blade to allow for hot air circulation, the outlet of hot air and cold air is ventilation hood, the ventilation hood is accessible to the ventilation cover and the top inner cover, the mounting frame. This oven changes the traditional low-speed hot air circulation and enriches the means of hot air circulation.

The present invention has reasonable structural design, beautiful appearance design, convenient production and assembly, convenient side door cleaning, good stability and safety, good effect of cold and hot air circulation, and good effect of food processing; it is mainly used as the air fryer oven with rotating cage and baking pan, as well as structural improvement in similar products.

Further features and aspects of the invention are disclosed with more specificity in the Detailed Description and Drawings provided herein and showing exemplary embodiments of the invention.

BRIEF DESCRIPTION OF THE DRAWINGS

An exemplary embodiment in accordance with or useful in practicing the invention is shown in the accompanying Drawings, of which.

Serial number and description of the drawings: 1. Top cover, 2. Top shield, 3. Upper shell, 4. Cover shell body, 5. Inner bracket, 501. Lighting hole, 6. Top inner cover, 7. Side net cover, 8. Side shell, 9. Rotating cage, 10. Touch screen, 11. Shell door, 1101. Translucent plastic, 1102. Door cover shell, 1103. High-temperature resistant sealing ring, 1104. Transparent tempered glass, 1105. Sliding buckle, 1106. Lower surface shell, 1107. Upper surface shell, 1108. Upper inner shell, 12. Oil filter net, 13. Oil slag tray, 14. Inner base plate, 15. Base shell, 16. Bottom edge shell, 17. Support frame, 18. Air filter net, 19. Electric heating tube, 20. Axial flow blade, 21. Top partition plate, 22. Cross flow blade, 23. Blade motor, 24. Mounting frame, 25. Pulley motor, 26. Belt pulley, 27. Ejector pin piston.

DESCRIPTION OF AN EXEMPLARY EMBODIMENT

Figure 1:
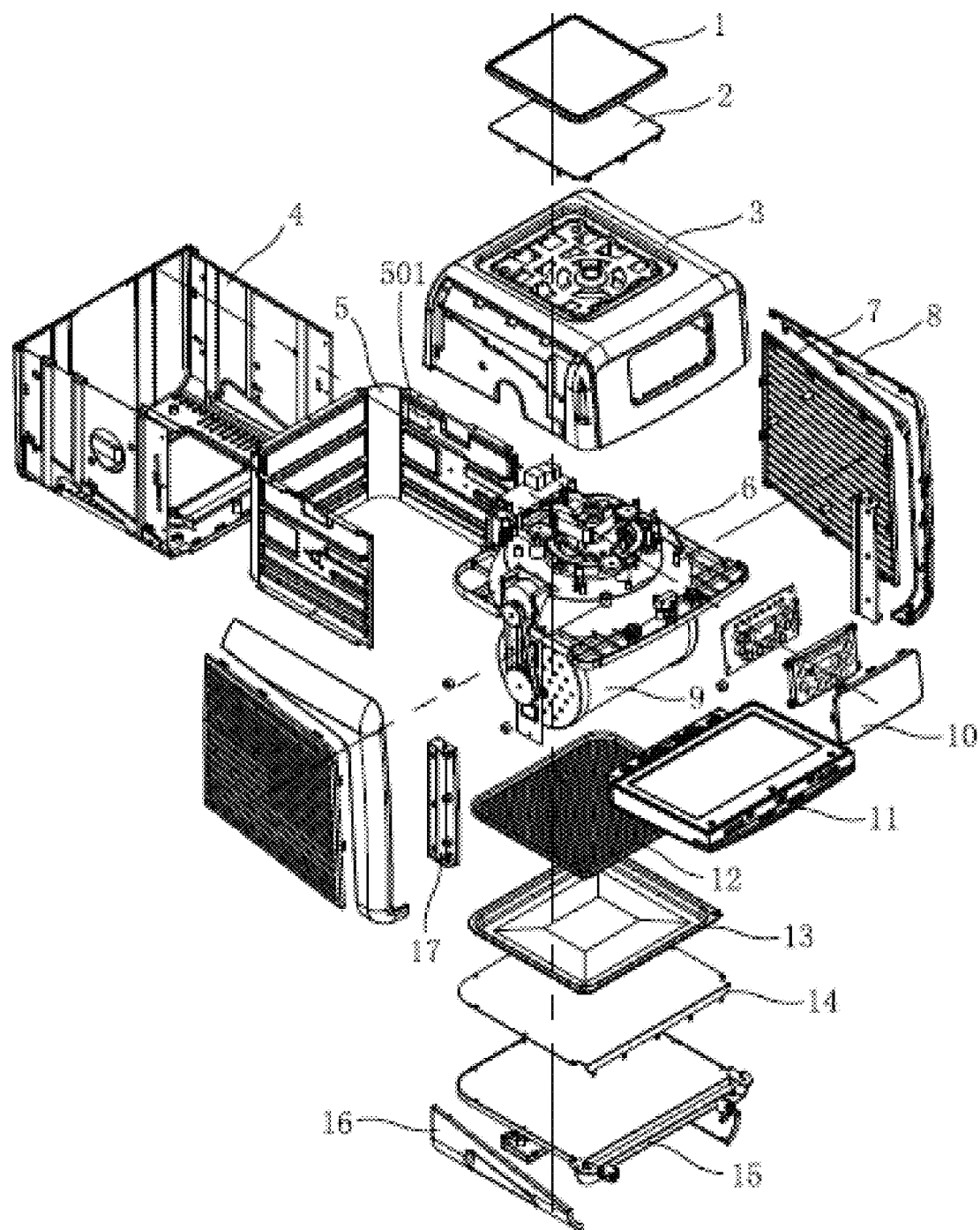
FIG. 1 is a schematic view of a partial exploded structure of the present invention.
Figure 2:
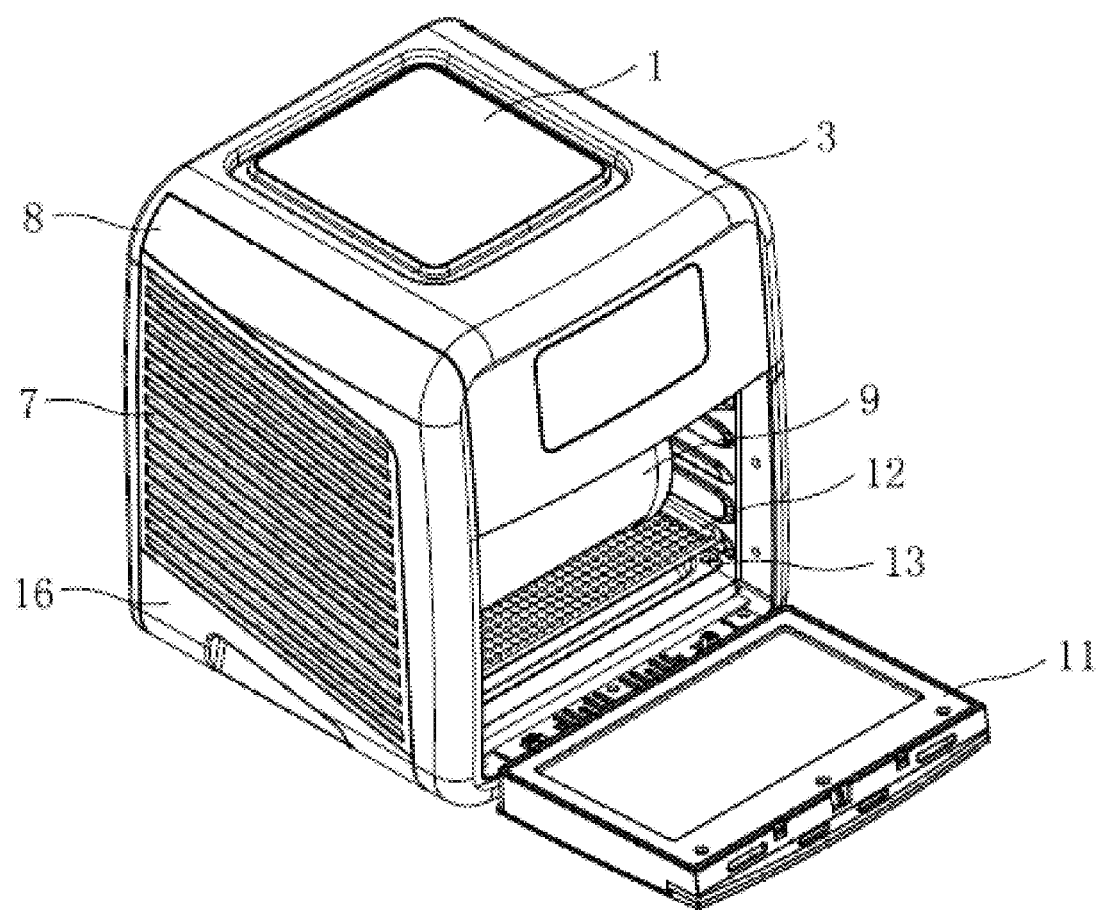
FIG. 2 is a schematic view of the side door of the present invention when opened
Figure 3:
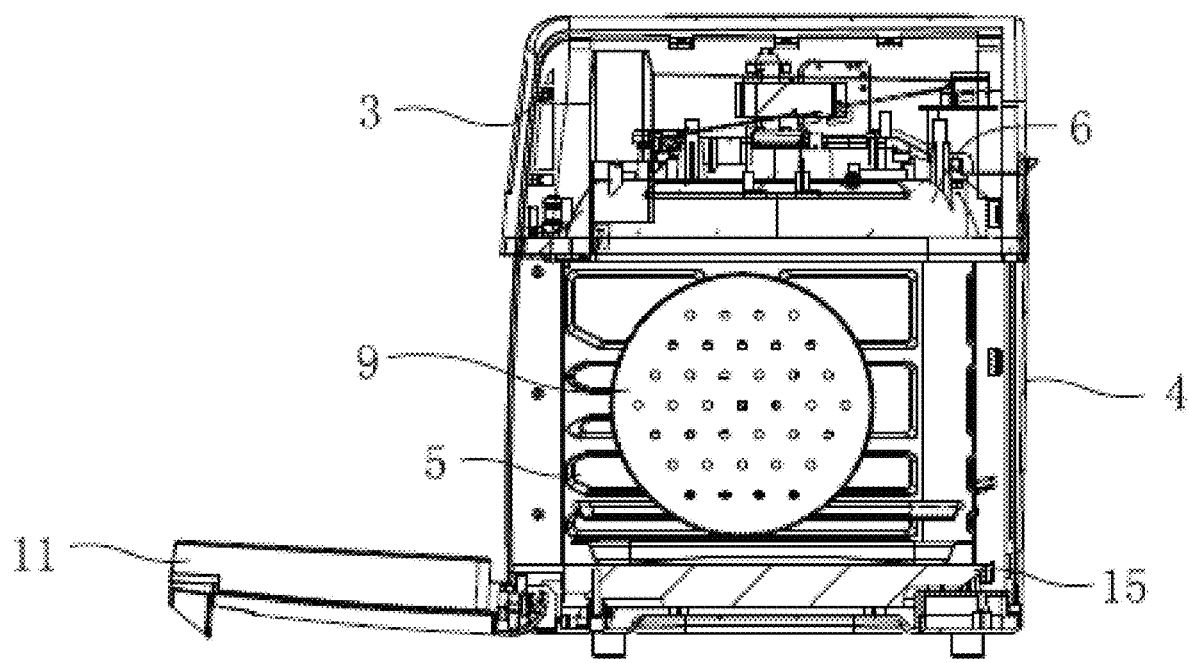
FIG. 3 is the schematic view 1 of the cross-sectional structure of FIG. 1.
Figure 4:
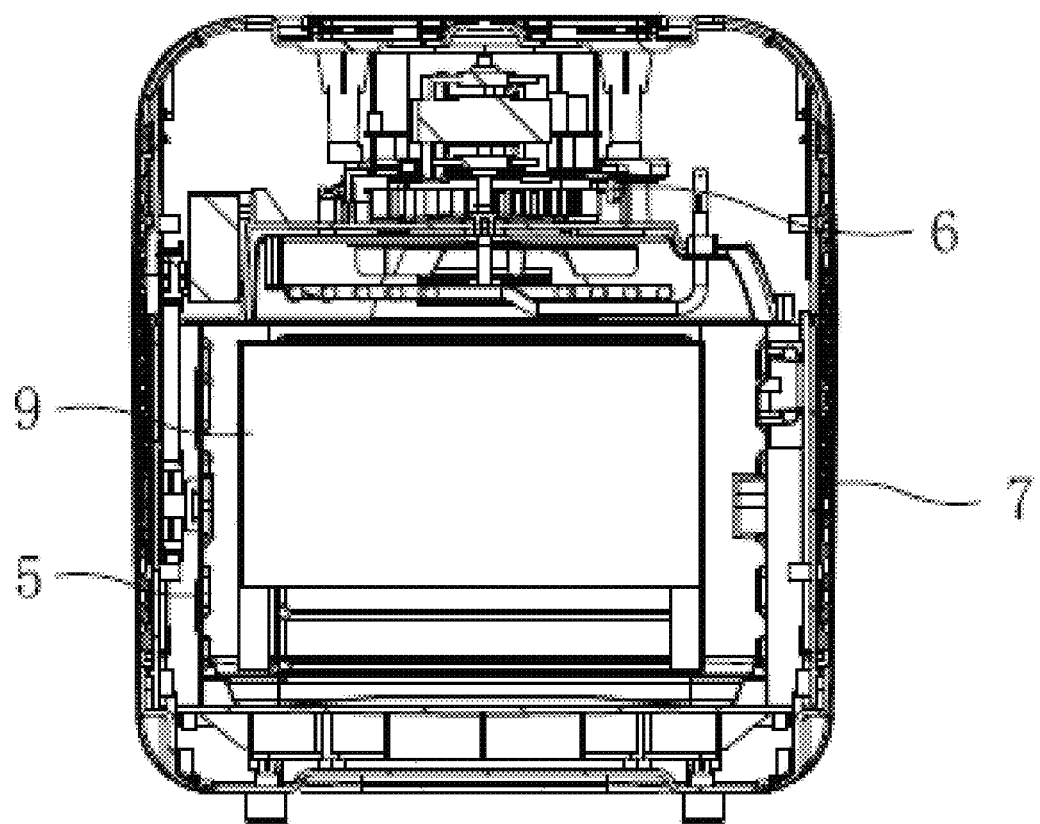
FIG. 4 is the schematic view 2 of the cross-sectional structure of FIG. 2.
Figure 5:
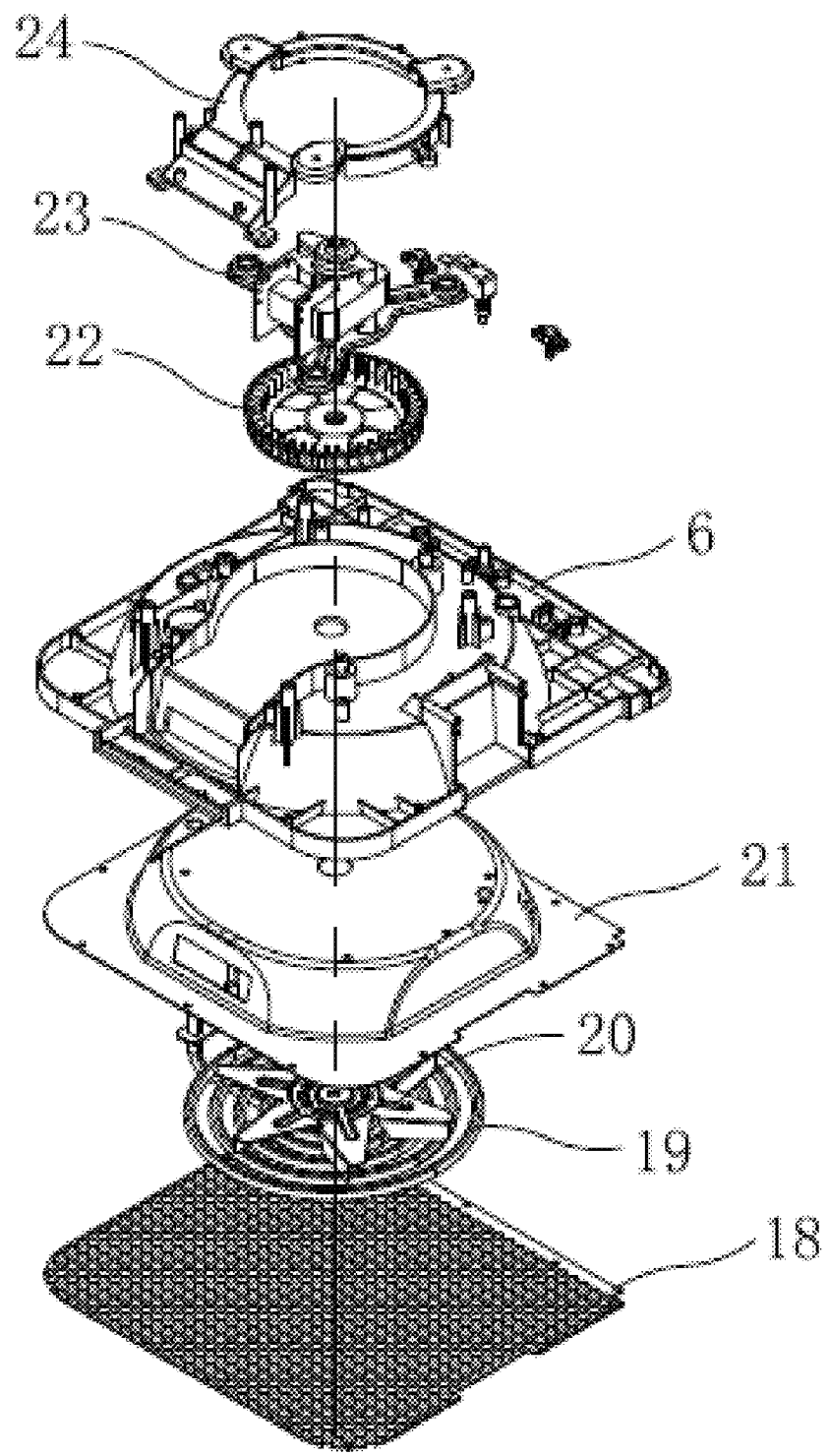
FIG. 5 is a schematic view of the exploded structure of the components in the top inner cover of the present invention.
Figure 6:
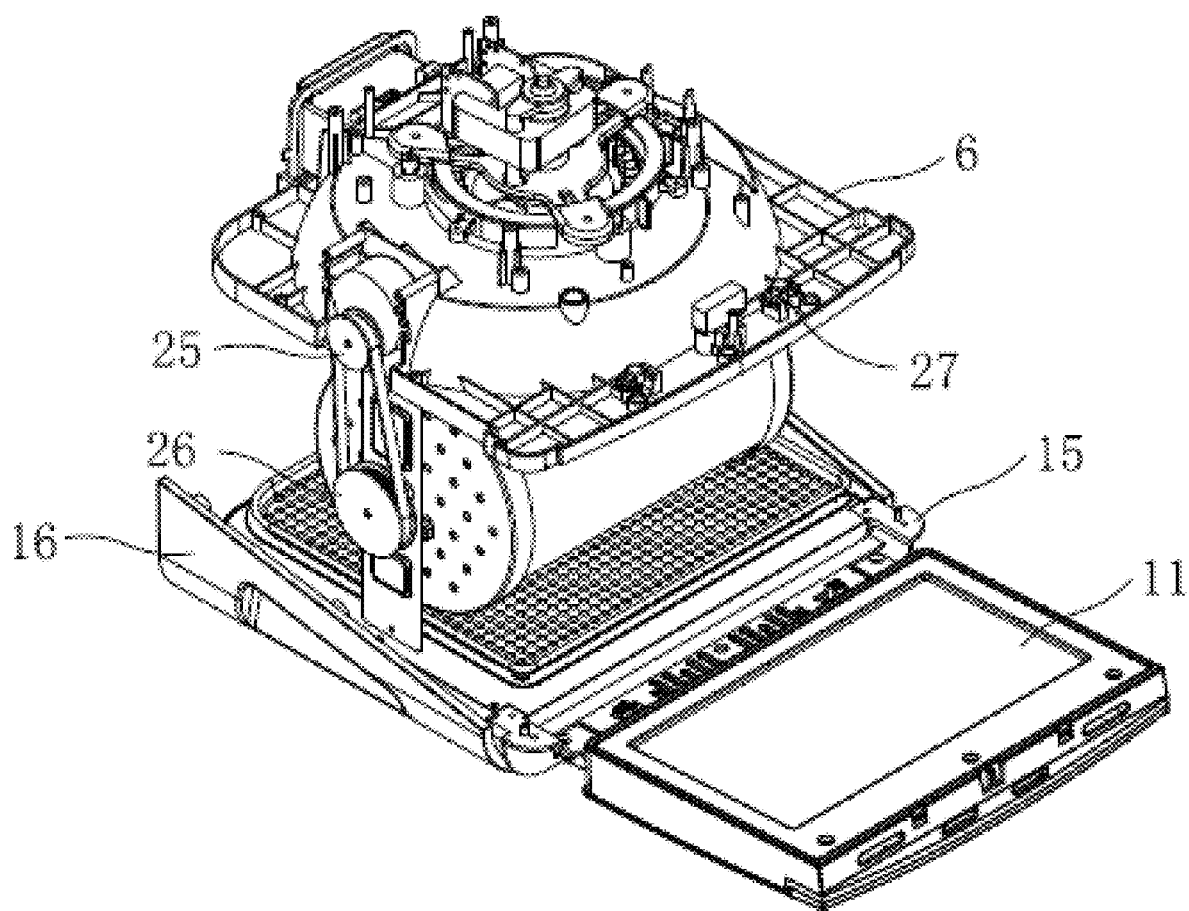
FIG. 6 is a schematic structural view of the inner portion of FIG. 2.
Figure 7:
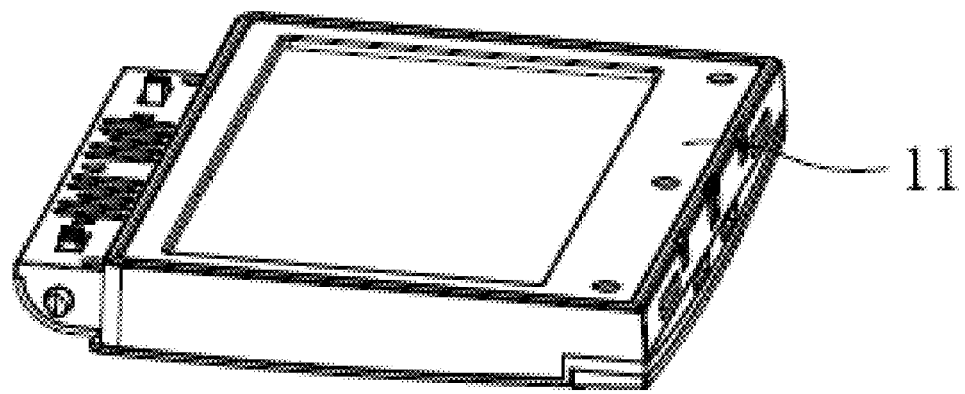
FIG. 7 is a schematic view of the side door structure of the present invention.
Figure 8:
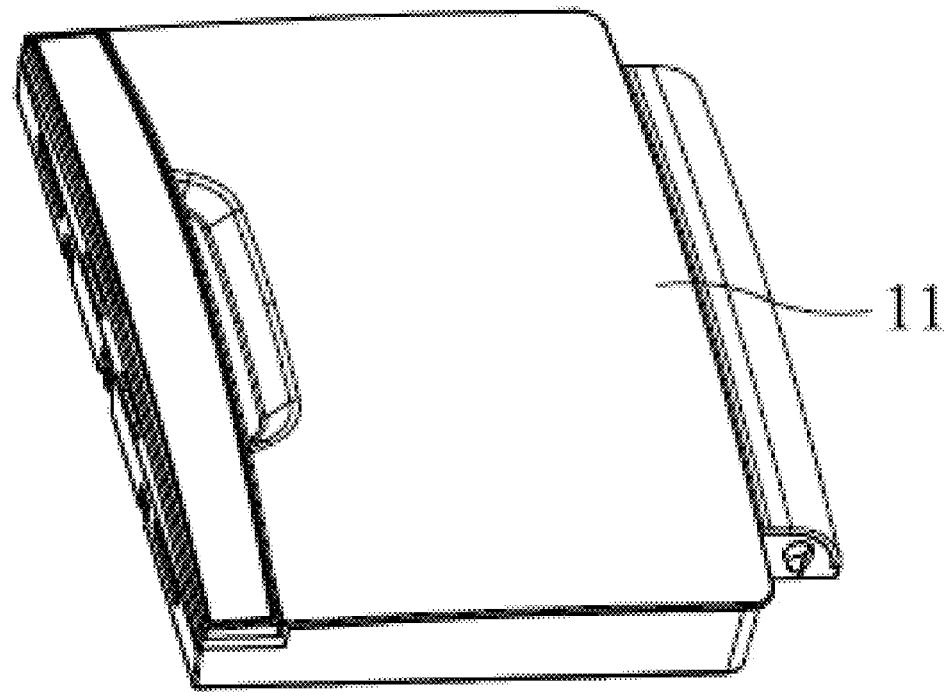
FIG. 8 is a second schematic view of the side door structure of the present invention.
Figure 9:
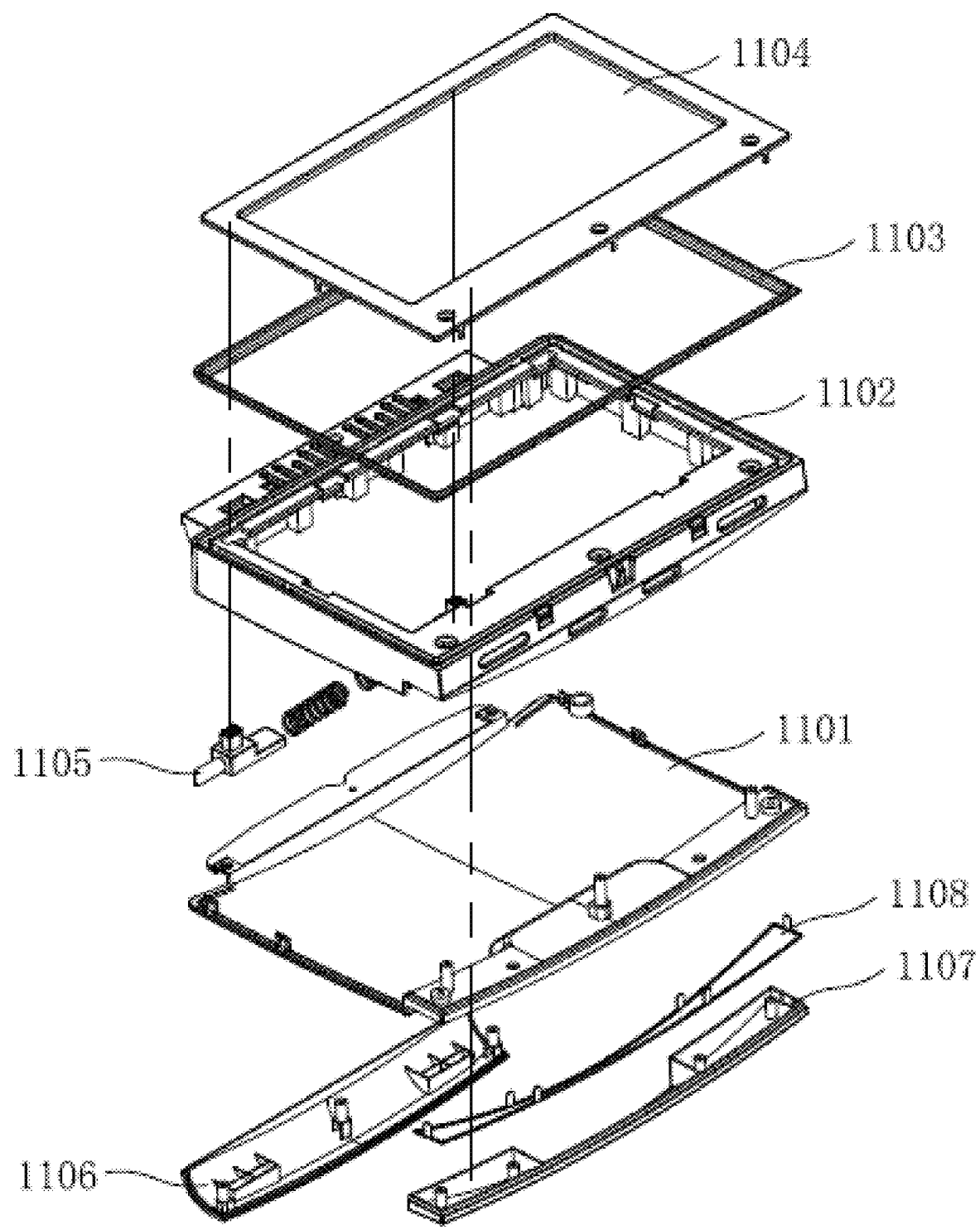
FIG. 9 is a schematic view showing the side door exploded structure of the present invention.

The structure and use of the present invention will now be further described in accordance with the drawings. As is shown from FIG. 1-9, the top inner cover 6 and the cover shell body 4 of this oven form the body with a front opening, the opening of the body is provided with a shell door 11, every inner walls of three side faces of the cover shell body are provided with an inner bracket 5, the front opening of the inner bracket is symmetrically provided with a support frame 17, the bottom part of the cover shell body is provided with a base shell 15, the flat surface of the base shell is provided with an inner base plate 14; the top inner cover is provided in the lower shell mouth of the upper shell body 3 that is provided with a control circuit board inside, the top inner cover is provided with a top partition plate 21 inside, the top partition plate is provided with a heating tube 19 and a axial flow blade 20 inside, the plate mouth of the top partition plate is provided with an air filter net 18, the body is provided with a rotating cage 9, the body portion at the bottom part of the rotating cage is provided with an oil filter net 12 and an oil slag tray 13, the inner wall of the inner bracket is provided with a sliding groove for fitting an oil filter net.

Its specific structure is described below: the top inner cover at one side of the front opening of the said cover shell body 4 is provided with a belt motor 25, the belt motor at one end of the top inner cover is joined with the belt pulley 26 at one side of the central shaft of the rotating cage through the belt pulley, its other side is buckled to the first shaft block on the inner wall of the inner bracket; the belt pulley is located in the chamber provided between the cover shell body and the inner bracket, the belt pulley in the chamber is fastened to the axle stand, the axle of the belt pulley extends into the second shaft block that is provided on the inner bracket, one side of the central shaft of the rotating cage is engaged with the axle of the belt pulley, the central shaft of the rotating cage is provided on the end cap at both sides of the rotating cage that is provided with a rotating cage door, or is buckled through the end caps on both sides of the rotating cage. The top hollow hole of the upper shell is provided with a top cover 2, the top cover is buckled with the upper shell and is provided with a top cover 1, the upper shell above the shell door is provided with a touch screen assembly, the touch screen assembly is provided with a touch screen 10, the upper shell at the rear side of the cover shell body is provide with a ventilation hood. The top portion of the said top inner cover is provided with a cooling chamber, the cooling chamber is provided with a cross flow blade 22, the motor shaft of the blade motor 23 passes through the top inner cover and is simultaneously joined with the cross flow fan blade and the axial flow fan blade, the blade motor is provided at the mouth of the top inner cover through the mounting frame 24, the cross flow blade is like a disc, the inner wall at the mouth is provided with the curved blades which are tipped inwardly and centrally, the disc surface is provided with a blade hollow hole, the side where the mounting frame is buckled with the top inner cover is tightly joined with the ventilation hood, the ventilation hood of the top inner cover is provided with a through-hole that is accessible to the top partition plate 21. The two side faces of the front opening of the said cover shell body are symmetrically provided with the side net cover 7, the side case 8 and the bottom case 16, the bottom case is provided in two ends at the bottom part of the cover shell body, the bottom case is triangular, the side case is provided at the upper corners in both ends of the cover shell body at one side of the front opening, the side case is "L-shaped", and the side net cover is provided in the frame that is formed by the side case and the bottom case. The inner wall of the said inner bracket is provided with a lighting hole 501, the lighting hole is provided with a light, and the inner wall of the inner bracket is provided with the upper, middle and lower chutes.

The specific structure of the shell door is described below: the shell door is buckled and hinged with the bottom side of the opening at one end of the base shell through the sliding buckles 1105 on two sides at one end, the sliding buckle is provided with a pin shaft and a push button head, the push button head is arranged at 90° with the pin shaft, the push button head extends out from the door cover shell 1102 through the shell door spring, when the shell door and the body are closed, the push button head of the sliding buckle is against the edge of the base in the body, the upper and lower ventilation holes are provided at the sliding buckle of the door cover shell and the closing position of the top part of the door cover shell respectively, the top inner cover corresponding to the ventilation hole at the top part of the door cover shell is provided with an ejector pin piston 27, the ejector pin piston is fastened on the top inner cover through the ejector pin spring and the ejector pin block, the transparent tempered glass 1104 is connected to the inner window of the door cover shell through the door cover frame and the high temperature resistant sealing ring 1103, the front window of the door cover shell is connected with the translucent plastic 1101, the translucent plastic is aligned with the transparent tempered glass, the upper and lower edges of the translucent plastic are provided with the lower surface case 1106 and the lower surface case 1107, the door cover shell in the upper case is provided with the upper inner case 1108.

To use this oven, open the shell door, remove the oil filter net, or load the oil filter net under the rotating cage, put the food into the cage, close the shell door, select the desired function button on the touch screen, then this oven can be readily used. Of the said usages, the food on the disc can be also directly processed through the oil filter net or the food tray by removing the rotating cage.

While the invention has been shown and described with reference to a specific exemplary embodiment, it should be understood by those skilled in the art that various changes in form and detail may be made without departing from the spirit and scope of the invention, and that the invention should therefore only be limited according to the following claims, including all equivalent interpretation to which they are entitled.

The invention claimed is:
1. An air fryer oven comprising:
   a top inner cover and a cover shell together forming a body with a front opening, the opening is provided with a shell door,
   inner walls of three side faces of the cover shell are each provided with an inner bracket,
   the front opening of each inner bracket is symmetrically provided with a support frame,
   a bottom part of the cover shell is provided with a base shell,
   a flat surface of the base shell is provided with an inner base plate;
   the top inner cover is provided in a lower shell mouth of the cover shell that is provided with a control circuit board inside,
   the top inner cover contains within a top partition plate,
   the top partition plate contains within a heating tube and an axial flow fan blade,
   a plate mouth of the top partition plate is provided with an air filter net,
   the body is provided with a rotating cage,
   a body portion at a bottom part of the rotating cage is provided with an oil filter net and an oil slag tray,
   an inner wall of each inner bracket is provided with a sliding groove for fitting the oil filter net;
   wherein the top inner cover at one side of the front opening is provided with a belt motor,
   the belt motor at one end of the top inner cover is joined with a belt pulley at one side of a central shaft of the rotating cage through the belt pulley,
   the other side of the central shaft is buckled to a first shaft block on the inner wall of each inner bracket,
   the central shaft is provided on an end cap at both sides of the rotating cage,
   the rotating cage is provided with a rotating cage door, or buckled through the end cap at two ends of the rotating cage.

2. The air fryer oven according to claim 1, wherein the belt pulley is located in a chamber provided between the cover shell and the inner brackets,
   the belt pulley is fastened in the chamber to an axle stand,
   an axle of the belt pulley extends into a second shaft block that is provided on the inner brackets,
   one side of the central shaft of the rotating cage is engaged with the axle of the belt pulley.

3. The air fryer oven according to claim 2, wherein a top hollow hole of the cover shell is provided with a top cover, the top cover is buckled with the cover shell and is provided with a second top cover, the cover shell above the shell door is provided with a touch screen assembly, the touch screen assembly is provided with a touch screen, the cover shell at a rear side of the cover shell is provided with a ventilation hood.

4. The air fryer oven according to claim 3, wherein a top portion of the top inner cover is provided with a cooling chamber, the cooling chamber is provided with a cross flow fan blade, a motor shaft of a fan blade motor passes through the top inner cover and is simultaneously joined with the cross flow fan blade and the axial flow fan blade, the fan blade motor is provided at a mouth of the top inner cover through a mounting frame, the cross flow fan blade has a disc shape, an inner wall at the mouth of the top inner cover is provided with curved blades which are tipped inwardly and centrally, a surface of the disc shape is provided with a blade hollow hole, the mounting frame is buckled with the top inner cover at a side of the disc shape is tightly joined with the ventilation hood, the ventilation hood is provided with a through-hole that is accessible to the top partition plate.

5. The air fryer oven according to claim 4, wherein the shell door is buckled and hinged with a bottom side of the front opening at one end of the base shell through a sliding buckle on two sides at one end, the sliding buckle is provided with a pin shaft and a push button head, the push button head is arranged at 90° with the pin shaft, the push button head extends out from a door cover shell through a shell door spring, when the shell door and the body are closed, the push button head of the sliding buckle is against the edge of the base in the body, the upper and lower ventilation holes are provided at the sliding buckle and the closing position of the top part of the door cover shell respectively, the top inner cover corresponding to the ventilation hole at the top part of the door cover shell is provided with an ejector pin piston, the ejector pin piston is fastened on the top inner cover through an ejector pin spring and an ejector pin block, a transparent tempered glass is connected to an inner window of the door cover shell through a door cover frame and a high temperature resistant sealing ring, a front window of the door cover shell is connected with a translucent plastic, the translucent plastic is aligned with the transparent tempered glass, upper and lower edges of the translucent plastic are provided with a lower surface case and the lower surface case, the door cover shell in the upper case are provided with an upper inner case.

6. The air fryer oven according to claim 5, wherein the chamber located between the cover shell and the inner bracket, and a passage between the upper and lower ventilation holes of the door cover shell and the ejector piston of the inner cover, are accessible to the base shell at the bottom part of the cover shell respectively, cold air passes through the base shell at the bottom part of the cover shell and a top hollow hole of the cover shell, and the cross flow fan blade in the top inner cover to allow for cold air circulation; hot air passes through an inner chamber that is formed by the bottom shell, the top inner cover and the shell door, and the cross flow fan blade to allow for hot air circulation, an outlet of hot air and cold air is provided by the ventilation hood, the ventilation hood is accessible to the ventilation cover, the top inner cover, and the mounting frame.

7. The air fryer oven according to claim 1, wherein two side faces of the front opening of the cover shell are symmetrically provided with a side net cover, a side case and a bottom case, the bottom case is provided in two ends at a bottom part of the cover shell body, the bottom case is triangular, the side case is provided at the upper corners in both ends of the cover shell at one side of the front opening, the side case is "L-shaped", and the side net cover is provided in a frame that is formed by the side case and the bottom case.

8. The air fryer oven according to claim 1, wherein the inner wall of the inner bracket is provided with a lighting hole, the lighting hole is provided with a light, and the inner wall of the inner bracket is provided with upper, middle and lower chutes.

* * * * *